United States Patent [19]

Bowers, Jr.

[11] Patent Number: 4,957,634

[45] Date of Patent: Sep. 18, 1990

[54] HEAVY METAL RECOVERY PROCESS

[76] Inventor: Joseph S. Bowers, Jr., Apt. 1309, 3310 Washington Ave., Pascagoula, Miss.

[21] Appl. No.: 417,883

[22] Filed: Oct. 6, 1989

[51] Int. Cl.$^5$ .............................................. C02F 11/14
[52] U.S. Cl. ...................................... 210/711; 210/725; 210/729; 210/737; 210/912; 210/913; 210/914; 423/561.1; 423/566.1; 564/75
[58] Field of Search ............... 210/688, 710, 711, 724, 210/725, 727, 728, 729, 737, 912–914; 423/566.1, 561.1; 544/59, 389; 546/245; 548/531; 564/75

[56] References Cited

U.S. PATENT DOCUMENTS

| | | | |
|---|---|---|---|
| 3,755,161 | 8/1973 | Yokota et al. | 210/679 |
| 3,892,688 | 7/1975 | Motani et al. | 210/688 |
| 4,038,180 | 7/1977 | Talbert | 210/711 |
| 4,083,924 | 4/1978 | Styring | 423/561.1 |
| 4,578,195 | 3/1986 | Moore et al. | 210/913 |
| 4,624,790 | 11/1986 | Kamperman et al. | 210/912 |
| 4,670,160 | 6/1987 | Moriya et al. | 210/912 |

FOREIGN PATENT DOCUMENTS 50-99962  8/1975  Japan .................................. 210/914

*Primary Examiner*—Peter Hruskoci
*Attorney, Agent, or Firm*—Curtis L. Harrington

[57] ABSTRACT

A useful method for the recovery of heavy metal sulfides and alkali or alkaline earth metal salts of N-substituted dithiocarbamic acids from material containing heavy metal salts of N-substituted dithiocarbamic acids.

25 Claims, No Drawings

HEAVY METAL RECOVERY PROCESS

BACKGROUND OF THE INVENTION

The manufacture of printed circuit boards and the process of plating metal on plastic substrates involves an electrolytic or electrodeless deposition of a type of heavy metal, most commonly copper, nickel or chromium onto an appropriately prepared surface. Many of the processes used in this manufacturing process involve the use of strong complexing or chelating agents such as ethylene diamine tetra acetic acid, known as EDTA, nitrilotriacetic acid, known as NTA, tartrate, Quadrol, citrate, glycolate, ethanolamines and ammonia.

For example, a publication by R. E. Wing and W. E. Rayford, entitled, "Heavy Metal Removal Using Dithiocarbamates", *Plating and Surface Finishing*, 69(1), 1982, pp 67–71, describes how the dithiocarbamates are utilizable to remove heavy metals. U.S. Pat. No. 4,731,187 issued to Moriya et al, entitled "Removal of Heavy Metals From Waste Water" discloses the use of metal scavengers containing dithiocarbamic acid compounds. The Moriya technique involves the use of a metal scavenger containing at least one carbodithio group and/or at least one carbodithioate salt group as N-substituents per molecule, together with at least one of sodium monosulfide, sodium polysulfides and sodium hydrogen sulfide to waste water containing heavy metal ions so as to scavenge and remove the metal ions from the waste water. The practice of this invention creates a heavy metal bearing sludge which has to be disposed.

U.S. Pat. No. 4,578,195, issued to Moore et al, entitled "Process for the Purification of Effluents and Purge Streams Containing Trace Elements" discloses the method of contacting the heavy metal effluent with a poly(dithiocarbamate) chelating agent whereby the polluting elements are absorbed. The patent states that after contact with the poly( dithiocarbamate) resin, the residual content of the polluting elements in the effluent is reduced to a level below the environmental Protection Agency required levels so that the effluent can safely be discharged int° the surrounding ecosystem.

The Moore patent goes on to state that the poly(dithiocarbamate) resin employed in the Moore process rigidly retains the chelated elements and that the poly(dithiocarbamate) resin containing the chelated elements can be disposed of in a designated sanitary landfill area. Disposal of heavy metal bearing sludge produced by the method disclosed in the Moore patent represents a cost of disposal as well as the loss of the value of the metals contained therein.

Complexing agents, including those described above, form water soluble metal complexes critical for the proper deposition of a uniform, smooth metallic surface. However, the soluble metal complexes also render the metal difficult to remove by conventional waste water treatment techniques such as precipitation by pH adjustment or by addition of ferrous sulfate.

Alkali metal salts of dithiocarbamic acids, and most commonly sodium or potassium salts of N,N-diethyl- or N,N-dimethyldithiocarbamic acids, have been found to effectively precipitate heavy metals from waste water containing complexing or chelating agents. The dithiocarbamate method of heavy metal ion removal from waste water effectively removes the heavy metal, but produces large quantities of heavy metal bearing sludge which must be disposed of in an approved hazardous landfill. Consequently, sludge disposal is very expensive, environmentally detrimental, wasteful of natural resources, and involves compliance with local, state and federal regulations. In addition, the sludge producer often retains long term liability for the sludge despite the manner of its disposal/waste storage.

SUMMARY OF THE INVENTION

Essentially, the process of the present invention is performed by bringing the heavy metal salts of N-substituted dithiocarbamic acid present within the sludge, into contact with a water soluble metallic sulfide salt. After vigorous agitation and sufficient time to complete the reaction, the products formed are heavy metal sulfides and a soluble metallic salt of an N-substituted dithiocarbamic acid, as is illustrated in the following reaction:

Heavy Metal Bearing Sludge

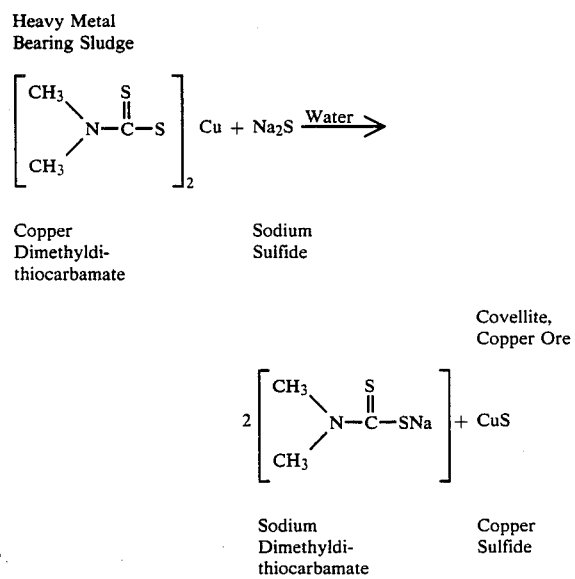

Copper Dimethyldithiocarbamate     Sodium Sulfide

Covellite, Copper Ore

Sodium Dimethyldithiocarbamate     Copper Sulfide

The heavy metal sulfides, which then comprise mineral ores suitable for smelting, are then isolated from the reaction mixture by any suitable solids-liquids separation technique, such as filtration.

The alkali or alkaline earth metal salt of the N-substituted dithiocarbamic acid remains in the filtrate as an aqueous solution and can be directly utilized industrially in this filtrate form. Alternately, the filtrate solution can be concentrated by vacuum assisted evaporation. Whether or not concentrated, the N-substituted dithiocarbamic acid is again ready to b Ⓡemployed in a process stream to remove heavy metals.

The process of the present invention can be practiced continuously along side the reaction in which the dithiocarbamic acid attains the heavy metals from the manufacturing process stream to form a continuously operating process system. Such a system could be operated at steady state with the concentrations and rates tailored to the process variables specific to the manufacturing operation at hand. Such a system could continuously produce the metal sulfide "ore" in sufficient amounts to permit economic recovery thereof.

The process of the present invention provides a method for the recovery of the heavy metals from the heavy metal hearing N-substituted dithiocarbamate sludge waste, a method for the recovery of alkali or alkaline earth metal salts of the N-substituted dithiocarbamic acid from the heavy metal bearing N-substituted dithiocarbamate sludge waste, as well as a method for disposal of heavy metal bearing N-substituted dithiocarbamate sludge which is economical, environmentally safe, and conserves the mineral resources contained herein. The process of the present invention assists in eliminating the disposal liability for the producer.

DETAILED DESCRIPTION OF THE PREFERRED EMBODIMENT

The reaction process of the present invention is believed to proceed by anion displacement. It appears that the sulfide anion displaces two of the N-substituted dithiocarbamate anions from the heavy metal and forms the insoluble heavy metal sulfide. The liberated N-substituted dithiocarbamate would then become water soluble by assuming the cation which accompanied the sulfide as the sulfide entered the process.

The heavy metal salts of the N-substituted dithiocarbamic acids within the waste sludge upon which the process of the present invention operates can be represented by formulas 1 and 2:

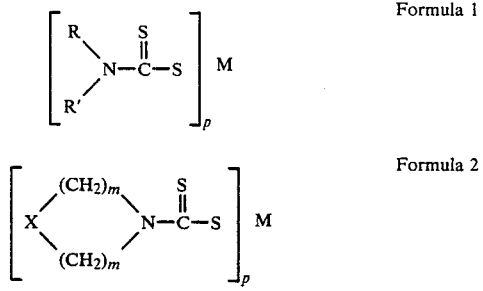

wherein:
M represents chromium, manganese, iron, cobalt, nickel, copper, zinc, palladium, silver, cadmium, tin, platinum, gold, mercury, lead, barium, radium or uranium;
R represents any alkyl, cycloalkyl, alkylaryl, or aryl;
R' represents any alkyl, cycloalkyl, alkylaryl, aryl or hydrogen; and wherein R and R' may be alike or different at the same time;
X may be O, N, S, N—R" or $(CH_2)_n$;
R" represents any alkyl, cycloalkyl, alkylaryl, aryl or hydrogen;
m is an integer from 1 to 2;
n is an integer from 1 to 2; and,
p is an integer from 1 to 3.

N-substituted dithiocarbamates useful in the present invention include, but are not limited to methyl, ethyl, propyl, butyl, benzyl, and higher alkyl or alkylaryl dithiocarbamates; dimethyl, diethyl, dipropyl, dibutyl, dibenzyl and higher dialkyl or di(alkylaryl)dithiocarbamates; cyclopentyl, cyclohexyl, dicyclohexyl and other monocycloalkyl or dicycloalkyldithiocarbamate; methylethyl, ethylbutyl, cyclohexylethyl, methylbenzyl and other mixed alkyl, cycloalkyl or alkylaryldithiocarbamates; diphenyl, ditolyl, dinaphthl and other diaryldithiocarbamates; methylphenyl, cyclohexyltolyl, benzylphenyl and other mixed alkyl, cycloalkyl, alkylaryl or aryldithiocarbamates; tetramethylene, pentamethylene and other carbocyclic disubstituted dithiocarbamates; and, morpholino, piperdino and other heterocyclic disubstituted dithiocarbamates.

The solvent media employed in the process of this invention are of such a nature that mutual solubility is provided for both the alkali or alkaline earth metal sulfide and the alkali or alkaline earth metal salt of the N-substituted dithiocarbamic acid with negligible solubility for the heavy metal sulfide. The solvent media should be chemically inactive with respect to both the reactants and products. The process of this invention can be carried out in aqueous solutions of lower alcohols or in a two liquid phase system composed of water and either esters, ethers, aliphatic or aromatic hydrocarbons.

Examples of non-aqueous co-solvents which can be utilized in accordance with this invention are methyl, ethyl and propyl alcohols; ethyl, propyl, butyl and higher acetates; diethyl ether and other dialkyl ethers; pentane, hexane, cyclohexane, heptane and other aliphatic and cycloaliphatic hydrocarbons; and, benzene, toluene, xylenes and other aromatic hydrocarbons. For convenience and economy it may be preferred to carry out the process of this invention in water alone. Since waste sludge typically contains from about 20% to about 80% water, additional water requirements are based on the viscosity limitations of the equipment used for agitation.

The water soluble metal sulfides employed in the process of this invention can be selected from the commercially available alkali and alkaline earth metal sulfides which display water solubility. Examples of alkali and alkaline earth metal sulfides which can be utilized in accordance with this invention are sodium sulfide, potassium sulfide, magnesium sulfide and calcium sulfide. For simplicity, although both alkali and alkaline earth metals are permissible, this group will be referred to as alkali/alkaline earth metals.

Although stoichiometrically equivalent quantities of the reactants may be employed to perform the reaction, as well as an excess of either of the reactants, it is preferred to employ an excess of the alkali/alkaline earth metal sulfide. The preferred excess of the sulfide should be from about 0% to about 25% of the stoichiometric quantity and preferably about 2% to about 8% of the stoichiometric quantity. When stoichiometrically equivalent quantities of the reactants or a stoichiometric deficiency of the sulfide is used, the yield of the alkali/alkaline earth metal salt of the N-substituted dithiocarbamate is lower than when excess sulfide is used. The lower yield is believed to be due an increase in oxidative side reactions.

The range of temperatures within which the present invention may be practiced are from about 0° C. to about 100° C. and preferably about 20° C. to about 40° C. Temperatures below about 20° C. extend the reaction time. Temperatures above about 40° C. lower the yield of the alkali or alkaline earth metal salt of the N-substituted dithiocarbamic acid. The lowered yield due to higher temperatures are believed to be due to increased oxidative and hydrolysis side reactions.

The process of this invention can be carried out in a range of pH of from about 7 to about 14 and preferably in a range of pH of from about 8 to about 10. Adjustment of the waste sludge pH prior to the addition of the alkali/alkaline earth metal sulfide may be necessary for optimum results.

The preferred type of metal in the metal hydroxide used for pH adjustment should correspond to the same metal in the alkali/alkaline earth metal sulfide used in the process of this invention. Thus, for example, if potassium sulfide were used in the process of this invention, potassium hydroxide would be the preferred base to be used for pH adjustment. Conducting the process below a pH of about 7 can result in the production of hydrogen sulfide and hydrolysis of the alkali/alkaline earth metal salt of the N-substituted dithiocarbamic acid. Hydrolysis side reactions and hydrogen sulfide production become faster and more predominant as the pH drops further below 7.

The process of this invention can be carried out above, at, or below atmospheric pressure. For convenience, it is preferred to carry out the process of this invention at atmospheric pressure. Regardless of reaction pressure it is preferred to carry out the process of this invention in such a way that oxygen is excluded from the reaction site. Nitrogen gas is the preferred inerting medium. Excluding oxygen reduces yield losses due to oxidative side reactions.

The process of the present invention is amenable to batch or continuous reaction methods. Although the example recited herein describes batch processing, the method involved is easily adaptable for the continuous recovery of heavy metal sulfides and alkali/alkaline earth metal salts of N-substituted dithiocarbamic acids from a stream of any scale magnitude of heavy metal bearing sludge waste composed of heavy metal salts of N-substituted dithiocarbamic acids. The procedure disclosed herein specifically embraces such a continuous method.

EXAMPLE 1

Example 1 illustrates the use of stoichiometrically equivalent amounts of alkali/alkaline earth metal sulfide with the heavy metal salt of N-substituted dithiocarbamic acid.

To a stirred 500 ml round bottom flask equipped with a nitrogen purge, thermometer and an addition funnel were added 6.36 grams of copper N,N-dimethyldithiocarbamate slurried in about 200 ml of water, 5.0 ml of 1.0M sodium hydroxide solution and 63.0 ml of 0.3325M sodium sulfide solution. The reaction mixture was stirred at 25° C. for one hour. The completed reaction mixture was filtered to form a filter cake. The filter cake (copper sulfide) was then washed with water and dried. The crude yield of copper sulfide was 1.95 grams, representing a yield of 97.5 per cent of the theoretical yield. The filtrate contained 5.1 grams of sodium N,N-dimethyldithiocarbamate, representing a yield of 85 percent of the theoretical yield.

EXAMPLE 2

Example 2 illustrates the use of less than a stoichiometric equivalent of alkali/alkaline earth metal sulfide with the heavy metal salt of N-substituted dithiocarbamic acid.

To a stirred 500 ml round bottom flask equipped with a nitrogen purge, thermometer and an addition funnel were added 6.27 grams of nickel N,N-dimethyldithiocarbamate slurried in about 200 ml of water, 5.0 ml of 1.0M sodium hydroxide solution and 53.6 ml of 0.3325M sodium sulfide solution. The reduction in sodium sulfide represents a 15% stoichiometric deficiency with respect to what would be an equimolar amount. The reaction mixture was stirred at 25° C. for one hour. The completed reaction mixture was filtered to form a filter cake. The filter cake (nickel sulfide) was then washed with water and dried. The crude yield of nickel sulfide was 1.50 grams, representing a yield of 79.0 per cent of the theoretical yield. The filtrate contained 4.4 grams of sodium N,N-dimethyldithiocarbamate, representing a yield of 73 per cent of the theoretical yield.

EXAMPLE 3

Example 3 illustrates the use of a stoichiometric excess of alkali/alkaline earth metal sulfide with the heavy metal salt of N-substituted dithiocarbamic acid.

To a stirred 500 ml round bottom flask equipped with a nitrogen purge, thermometer and an addition funnel were added 7.55 grams of copper N,N-diethyldithiocarbamate slurried in about 200 ml of water, 5.0 ml of 1.0M sodium hydroxide solution and 66.0 ml of 0.3500M calcium sulfide solution. The reaction mixture was stirred for 1 hour at 25° C., filtered to form a filter cake. The filter cake (copper sulfide) was washed with water and dried. The crude yield of copper sulfide was 2.0 grams, representing a yield of 97 per cent of the theoretical yield. The filtrate contained 6.8 grams of calcium N,N-diethyldithiocarbamate, representing a yield of 97 per cent of the theoretical yield.

The forgoing disclosure and description of the invention are illustrative and explanatory, and various changes in the manner of implementation of practicing the invention including, but not limited to changes within the periodic nature of operation, changes in the scale of production employed, changes in operating conditions, changes in the details of the given examples, as well as changes in the purposes and environment in which the invention is practiced, may be made without departing from the spirit and scope of the invention.

I claim:

1. A process for the simultaneous recovery of heavy metal sulfides and alkali/alkaline earth salts of N-substituted dithiocarbamic acid, comprising the step of:

contacting, in the presence of an aqueous solvent, an alkali/alkaline earth metal sulfide selected from the group consisting of sodium sulfide, potassium sulfide, magnesium sulfide and calcium sulfide, with heavy metal salts of an N-substituted dithiocarbamic acid represented by a formula selected from the group consisting of the following formulas (1) and (2):

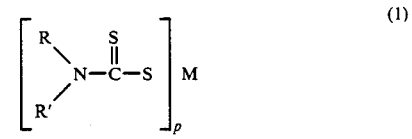

and

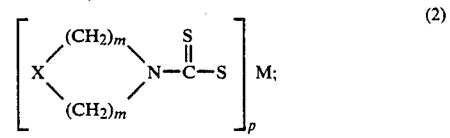

wherein M represents chromium, manganese, iron, cobalt, nickel, copper, zinc, palladium, silver, cadmium, tin, platinum, gold, mercury, lead, barium, radium or uranium; R represents any alkyl, cycloalkyl, alkylaryl, or aryl; R' represents any alkyl, cycloalkyl, alkylaryl, aryl or hydrogen, and wherein R and R' may be alike or different at the same time; X represents O, N, S, N—R" or $(CH_2)_n$; R" represents alkyl, cycloalkyl, alkylaryl, aryl or hydrogen; m is an integer from 1 to 2; n is an integer from 1 to 2; and, p is an integer from 1 to 3.

2. The process of claim 1, wherein said contacting occurs within a temperature range of from about 0° C. to about 100° C.

3. The process of claim 2, wherein said contacting occurs at a temperature range of from about 20° C. to about 40° C.

4. The process of claim 1, wherein said contacting occurs within a pH range of from about 7 to about 14.

5. The process of claim 4, wherein said contacting occurs within a pH range of from about 8 to about 10.

6. The process of claim 1, wherein said aqueous solvent further comprises: from about 5% to about 99% water; and from about 1% to about 95% of a material selected from the group consisting of:

an alkyl alcohol having from 1 to about 4 carbon atoms, an alkyl ester having from 1 to about 4 carbon atoms in the acid structural portion and from 1 to about 12 carbon atoms in the alcohol structural portion, an ether having from 2 to about 16 carbon atoms, an aliphatic hydrocarbon having from 4 to about 16 carbon atoms, and, an aromatic hydrocarbon having from 6 to 12 carbon atoms.

7. The process of claim 1, wherein said aqueous solvent is water.

8. The process of claim 1, wherein the molar ratio of said metal sulfide to said heavy metal salts of N-substituted dithiocarbamic acids is from about 0.25:1.0 to about 2.0:1.0.

9. The process of claim 1, wherein the molar ratio of said metal sulfide to said heavy metal salts of N-substituted dithiocarbamic acids is about 1.0:1.0 to about 1.1:1.0.

10. The process of claim 1, wherein said heavy metal salts of N-substituted dithiocarbamic acids have a sludge consistency.

11. The process of claim 1, and further comprising the step of separating heavy metal sulfide material from alkali/alkaline earth metal salts of said N-substituted dithiocarbamic acids formed as a result of said contacting step.

12. The process of claim 11, and further comprising the step of drying said heavy metal sulfide material formed as a result of said contacting step.

13. The process for the recovery of heavy metals as recited in claim 11, wherein said separation step is performed by filtering.

14. The process of claim 13 further comprising the step of reintroducing said separated alkali/alkaline earth metal salts of said N-substituted dithiocarbamic acids into the presence of heavy metal ions to scavenge the heavy metals.

15. The process of claim 14 wherein said steps are performed repeatedly.

16. The process of claim 13 further comprising the step of concentrating said alkali/alkaline earth metal salts of said N-substituted dithiocarbamic acids by evaporation.

17. The process of claim 16 wherein said evaporation step is performed at a pressure less than atmospheric pressure.

18. The process of claim 11 further comprising the step of reintroducing said separated alkali/alkaline earth metal salts of said N-substituted dithiocarbamic acids into the presence of heavy metal ions to scavenge the heavy metals.

19. The process of claim 18 wherein said steps are performed repeatedly.

20. The process of claim 11 further comprising the step of concentrating said alkali/alkaline earth metal salts of said N-substituted dithiocarbamic acids by evaporation.

21. The process of claim 20 wherein said evaporation step is performed at a pressure less than atmospheric pressure.

22. The process of claim 1 in which said alkali/alkaline earth metal sulfide is contacted with a sludge waste containing the copper salt of N,N-dimethyldithiocarbamic acid within a temperature range of from about 20° C. to about 40° C., and said aqueous solvent is water.

23. The process of claim 1 in which said alkali/alkaline earth metal sulfide is contacted with a sludge waste containing the nickel salt of N,N-dimethyldithiocarbamic acid within a temperature range of from about 20° C. to about 40° C., and said aqueous solvent is water.

24. The process of claim 1 in which said alkali/alkaline earth metal sulfide is contacted with a sludge waste containing the copper salt of N,N-diethyldithiocarbamic acid within a temperature range of from about 20° C. to about 40° C., and said aqueous solvent is water.

25. The process of claim 1 in which said alkali/alkaline earth metal sulfide is contacted with a sludge waste containing the nickel salt of N,N-diethyldithiocarbamic acid within a temperature range of from about 20° C. to about 40° C., and said aqueous solvent is water.

* * * * *